(12) United States Patent
Kaufman et al.

(10) Patent No.: US 8,145,698 B1
(45) Date of Patent: Mar. 27, 2012

(54) SELF ORGANIZING PEER-TO-PEER SYSTEM, METHOD, AND/OR APPARATUS

(75) Inventors: Matthew Kaufman, Bonny Doon, CA (US); Michael C. Thornburgh, Santa Cruz, CA (US)

(73) Assignee: Adobe Systems Incorporated, San Jose, CA (US)

( * ) Notice: Subject to any disclaimer, the term of this patent is extended or adjusted under 35 U.S.C. 154(b) by 421 days.

(21) Appl. No.: 11/969,186

(22) Filed: Jan. 3, 2008

(51) Int. Cl.
*G06F 15/16* (2006.01)
*G06F 15/173* (2006.01)

(52) U.S. Cl. .................. 709/201; 709/226; 707/622

(58) Field of Classification Search .......... 709/201, 709/226; 707/10, 622
See application file for complete search history.

(56) References Cited

U.S. PATENT DOCUMENTS

| | | | |
|---|---|---|---|
| 4,475,192 A | 10/1984 | Fernow et al. | |
| 5,774,660 A | 6/1998 | Brendel et al. | |
| 5,857,072 A | 1/1999 | Crowle | |
| 6,032,175 A * | 2/2000 | Fletcher et al. | 709/200 |
| 7,039,916 B2 | 5/2006 | Jason, Jr. | |
| 7,246,356 B1 | 7/2007 | Lozben et al. | |
| 7,274,706 B1 | 9/2007 | Nguyen et al. | |
| 7,305,486 B2 | 12/2007 | Ghose et al. | |
| 7,403,945 B2 | 7/2008 | Lin et al. | |
| 2002/0062375 A1 * | 5/2002 | Teodosiu et al. | 709/226 |
| 2002/0107935 A1 * | 8/2002 | Lowery et al. | 709/216 |
| 2002/0112058 A1 * | 8/2002 | Weisman et al. | 709/227 |
| 2002/0184310 A1 * | 12/2002 | Traversat et al. | 709/204 |
| 2003/0163702 A1 | 8/2003 | Vigue et al. | |
| 2004/0193461 A1 | 9/2004 | Keohane et al. | |
| 2005/0198634 A1 | 9/2005 | Nielsen et al. | |
| 2006/0041745 A1 | 2/2006 | Parnes | |
| 2006/0047831 A1 | 3/2006 | Piper | |
| 2006/0053209 A1 * | 3/2006 | Li | 709/217 |
| 2006/0101081 A1 | 5/2006 | Lin et al. | |
| 2006/0215652 A1 | 9/2006 | Strandridge et al. | |
| 2007/0179835 A1 | 8/2007 | Ott et al. | |
| 2007/0234428 A1 | 10/2007 | Rash | |
| 2008/0075048 A1 | 3/2008 | Suszko | |
| 2008/0280623 A1 | 11/2008 | Danne et al. | |
| 2008/0301219 A1 | 12/2008 | Thornburgh et al. | |
| 2009/0024739 A1 | 1/2009 | Thornburgh et al. | |
| 2009/0150534 A1 | 6/2009 | Miller et al. | |

OTHER PUBLICATIONS

Kaufman, Matthew, et al., "The Secure Media Flow Protocol—Version 1" Amicima, Inc., 2004, pp. 1-14.

(Continued)

*Primary Examiner* — Ranodhi Serrao
(74) *Attorney, Agent, or Firm* — Fish & Richardson P.C.

(57) ABSTRACT

A first and second peer devices can exchange information about a set of additional peer devices capable of providing one or more portions of one or more files. The first peer device can further communicate with the second peer device regarding specific portions of files available from the second peer device. Additionally, a subset of the set of additional peer devices available for communication can be identified based at least in part on the exchanged information. The first peer device can communicate with one or more of the identified subset of additional peer devices, at least in part, to transmit and/or receive one or more portions of one or more files. In addition, an intermittent communication between the first peer device and at least one of the set of additional peer devices can be established, at least in part, to identify another set of additional peer devices available for communication.

12 Claims, 3 Drawing Sheets

OTHER PUBLICATIONS

"Secure Hash Standard" Federal Information Processing Standards Publication 180-2, Aug. 1, 2002, pp. i-iii and 1-71.
Menezes et al., "Handbook of Applied Cryptography", CRC Press, 1996, pp. 321-383, 64 pages.
International Search Report and Written Opinion mailed Jun. 27, 2008 in related matter PCT/US2008/053865, 9 pages.
International Search Report and Written Opinion mailed Oct. 28, 2008 in related matter PCT/US08/063739, 14 pages.
Patent Application, filed Feb. 20, 2008, for related U.S. Appl. No. 12/034,649, 29 pages.
http://en.wikipedia.org/wiki/Gnutella, Apr. 25, 2008, 8 pages.
http://en.wikipedia.org/wiki/BitTorrent_%protocol%29, May 5, 2008, 13 pages.
http://en.wikipedia.org/wiki/Kazaa, May 3, 2008, 7 pages.
Co-pending U.S. Appl. No. 11/779,165, filed Jul. 17, 2007.
Co-pending U.S. Appl. No. 11/757,126, filed Jun. 1, 2007.
Office action mailed Jul. 2, 2009 in co-pending U.S. Appl. No. 11/757,126, 15 pages.
Response filed Sep. 28, 2009 in co-pending U.S. Appl. No. 11/757,126, 23 pages.
Office action mailed Sep. 3, 2009 in related matter U.S. Appl. No. 11/779,165, 21 pages.
Examiner's Interview Summary mailed Oct. 9, 2009 in U.S. Appl. No. 11/757,126, 3 pages.
Final Office action mailed Oct. 26, 2009 in U.S. Appl. No. 11/757,126, 10 pages.
Request for Continued Examination and Amendment After Final filed Nov. 13, 2009 in U.S. Appl. No. 11/757,126, 20 pages.
Amendment filed Oct. 28, 2009 in U.S. Appl. No. 11/779,165, 30 pages.
Office action mailed Nov. 9, 2009 in U.S. Appl. No. 12/034,649, 24 pages.
Office Action mailed Oct. 26, 2009, in co-pending U.S. Appl. No. 11/757,126, 18 pages.
Office Action mailed Jan. 4, 2010, in co-pending U.S. Appl. No. 11/757,126, 20 pages.

* cited by examiner

SELF ORGANIZING PEER-TO-PEER SYSTEM, METHOD, AND/OR APPARATUS

FIELD

Embodiments of the invention relate to the field of computing platform networks, and more specifically to peer-to-peer networks

BACKGROUND

Under some circumstances it may be advantageous for one or more computing platforms to communicate on a peer-to-peer basis. Accordingly, it may be advantageous to establish a peer-to peer network to facilitate this type of communication. A peer-to-peer network may be organized according to one or more characteristics, such as utilizing a centralized tracking server to organize nodes on the peer-to-peer network, for example. However, additional organizational structures for establishing peer-to-peer networks may be advantageous.

BRIEF DESCRIPTION OF DRAWINGS

Subject matter is particularly pointed out and distinctly claimed in the concluding portion of the specification. Claimed subject matter, however, both as to organization and method of operation, together with objects, features, and advantages thereof, may best be understood by reference of the following detailed description when read with the accompanying drawings in which:

DETAILED DESCRIPTION

Figure 1:
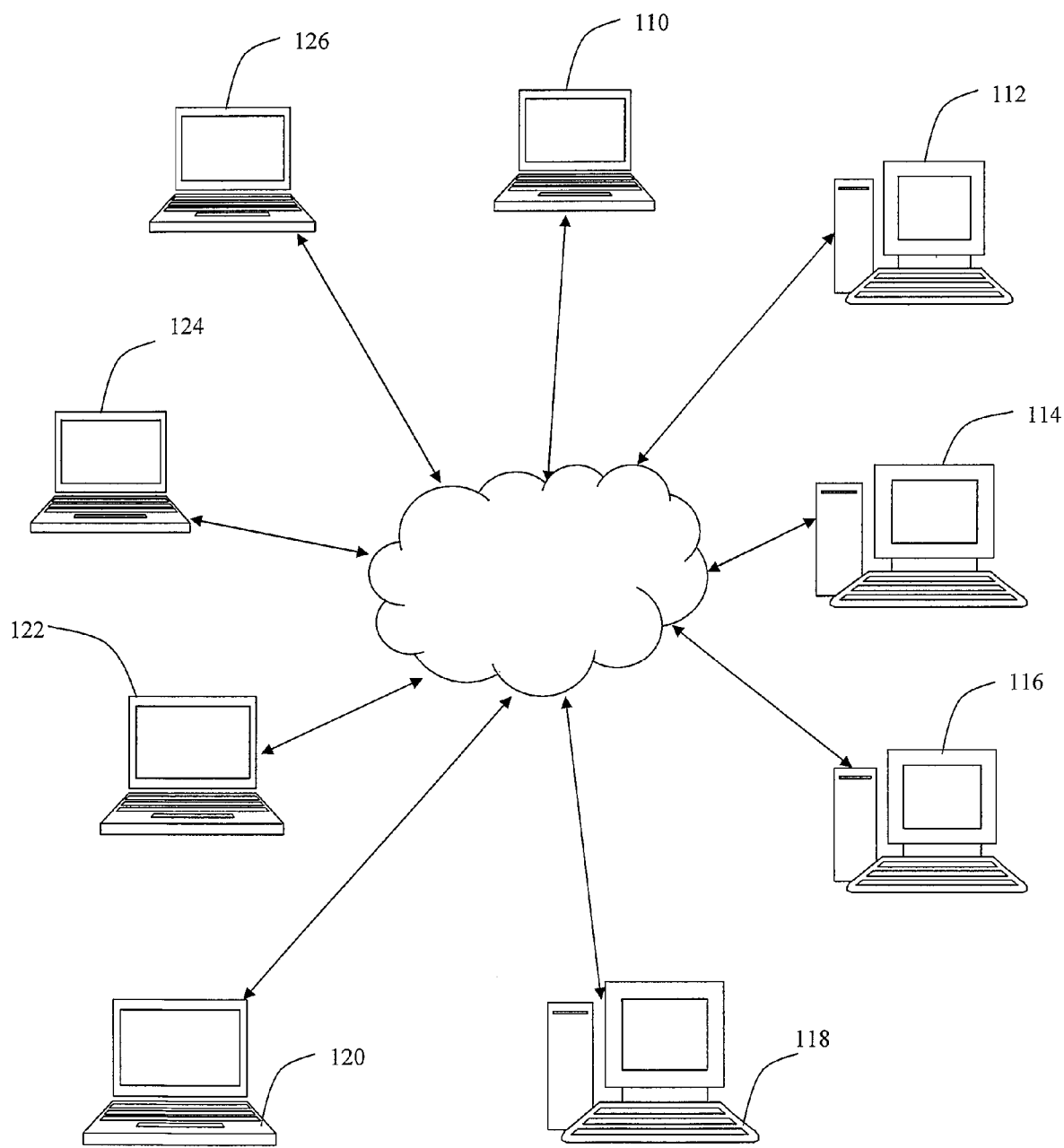
FIG. 1 is a schematic diagram of an embodiment, such as a network of computing platforms.

In the following detailed description, numerous specific details are set forth to provide a thorough understanding of the claimed subject matter. However, it will be understood by those skilled in the art that the claimed subject matter may be practiced without these specific details. In other instances, methods, procedures, components and/or circuits that would be known by one of ordinary skill have not been described in detail so as not to obscure the claimed subject matter.

Reference throughout this specification to "one embodiment" or "an embodiment" means that a particular feature, structure, or characteristic described in connection with the embodiment is included in at least one embodiment of claimed subject matter. Thus, the appearances of the phrase "in one embodiment" and/or "an embodiment" in various places throughout this specification are not necessarily all referring to the same embodiment. Furthermore, the particular features, structures, and/or characteristics may be combined in one or more embodiments.

Unless specifically stated otherwise, as apparent from the following discussion, it is appreciated that throughout this specification discussions utilizing terms such as "processing," "computing," "calculating," "selecting," "forming," "enabling," "inhibiting," "identifying," "initiating," "obtaining," "hosting," "maintaining," "representing," "modifying," "receiving," "transmitting," "establishing," "determining" and/or the like refer to the actions and/or processes that may be performed by a computing platform, such as a computer or a similar electronic computing device, that manipulates and/or transforms data represented as physical electronic and/or magnetic quantities and/or other physical quantities within the computing platform's processors, memories, registers, and/or other information storage, transmission, reception and/or display devices. Such actions and/or processes may be executed by a computing platform under the control of machine-readable instructions stored in a storage medium. Further, unless specifically stated otherwise, process described herein, with reference to flow diagrams or otherwise, may also be executed and/or controlled, in whole or in part, by such a computing platform.

In one embodiment, a computing platform may comprise one or more "communication adapters" to enable communication between processes executing on the computing platform and a network. Such a communication adapter may comprise a device capable of transmitting information to and/or receiving information from a communication channel and/or data link. In one particular embodiment, for example, a communication adapter may be capable of transmitting information to and/or receiving information from a data transmission medium according to a predefined communication protocol. However, this is merely an example of a communication adapter and claimed subject matter is not limited in this respect.

A "peer device" as used herein relates to a process that is capable of communicating with other processes through a network to perform one or more functions or tasks. A peer device may perform functions similar to a server at times, while also performing functions similar to a client at times. For example, a peer device may comprise one or more application programs hosted on a computing platform capable of transmitting information to and/or receiving information from a network through a communication adapter. However, this is merely one example of an implementation of a peer device according to a particular embodiment and claimed subject matter is not limited in this respect A "session" as referred to herein relates to a period during which processes communicate over a network to perform one or more tasks, operations and/or functions. In one particular embodiment, a session may be established between a client and a server for the purpose of providing one or more resources and/or services to the client. For example, such a session between a client and server may be established for any one of several communication protocols (e.g., TCP/IP) for the transmission of datagrams and/or packets. In a particular embodiment, such a session may be established according to a particular communication protocol enabled by a network employing network, data link and physical layer protocols for transmission of information between processes according to associated addresses. For further example, the session between a client and a server may, under some circumstance, be converted to a session between said devices as peers, such as by changing an endpoint discriminator in a communication between the client and the server to identify a second peer device, though, claimed subject matter is of course not limited to this example.

FIG. 1 is a schematic diagram of an embodiment, such as a network 100 of computing platforms. In this embodiment, a network of one or more computing platforms may be established for engaging in peer-to-peer communications. A "network" as referred to herein relates to a plurality of devices capable of communicating through transmission of information over data transmission media. In a particular example, a network may transmit data between devices over data links according to one or more communication protocols. However, this is merely an example of a network according to a particular embodiment and claimed subject matter is not limited in this respect. In one particular embodiment, a computing device 110 may attempt to join and/or establish a peer-to-peer network with one or more other computing devices. For example, computing device 110 may execute one or more instructions allowing computing device 110 to join and/or establish a peer-to-peer network. As just one example, computing device 110 may execute instructions for contacting a particular computing device, such as computing device 112. In one embodiment, computing device 110 may request information from computing device 112 at least in part to determine one or more aspects relating to a peer-to-peer network, such as a peer-to-peer file network. In one embodiment the peer-to-peer network may utilize a self organizing network topology, as discussed more fully below. A "self organizing network topology" as used herein may refer to a network topology wherein computing devices determine a network topology based at least in part on direct communication between peer nodes. For example, peer nodes may directly communicate with one another to share information regarding other peer nodes available on the peer-to-peer network, so that individual peer devices gather information regarding the network topology on their own without communicating with a tracking computing device, such as a tracking server. For example, computing device 110 may request information relating to one or more other peer nodes available for communication and/or one or more file portions available at those nodes. Furthermore, computing device 110 may, under some circumstances, additionally request information relating to one or more performance characteristics of those nodes, such as a latency time associated with those one or more nodes. In one embodiment, computing device 110 may request information relating to file portions available at those nodes and/or determine performance characteristics of those nodes based, at least in part, on direct communication with those nodes. Though, it should be noted that these are merely illustrative examples relating to a peer-to-peer network employing a self organizing network topology and that claimed subject matter is not limited in this regard.

In one particular embodiment, computing device 112 may reply with information relating to one or more additional peer nodes, such as computing devices 114 and/or 116. For example, computing device 112 may provide computing device 110 with a network location for computing devices 114 and/or 116, such as information sufficient for computing device 110 to contact computing devices 114 and/or 116, including one or more names for the devices, and/or one or more URL's associated with the devices. In addition, computing device 112 may provide computing device 110 with information relating to file portions available at the respective computing devices. Though, again, computing device 110 may obtain this information directly from computing devices 114 and/or 116. In addition, computing device 112 may provide computing device 110 with information relating to communications latency associated with computing devices 114 and/or 116. However, under some circumstances computing device 110 may determine communications latency through direct communication with computing devices 114 and/or 116. It should, however, be noted that this is merely an illustrative example relating to establishing a peer-to-peer network employing a self organizing network topology and that claimed subject matter is not limited in this regard. Having information relating to computing devices 114 and/or 116, computing device 110 may attempt to communicate with those communication devices as well, such as to identify one or more additional nodes available for communication. For example, computing devices 110 may contact computing device 114 and/or 116 and request information relating to one or more additional nodes available for communication. Computing devices 114 and/or 116 may respond with information relating to computing devices 118 and/or 120, such as the information relating to network location of computing devices 118 and/or 120, for example. In this particular embodiment, computing device 110 may continue to contact available computing devices until it has identified a desirable number of computing devices available for communication such as computing devices 122, 124, and/or 126. Such a number of available nodes that is desirable may vary depending upon one or more desired aspects of the peer-to-peer network, network latency, bandwidth, including file transfer time, and/or network reliability, etc. In addition, in response to requests for information from a particular node, that particular node may likewise request the same type of information from the requesting node. For example, if computing device 110 requests information about available nodes from computing device 112, then computing device 112 may likewise request that computing device 110 provide the same type of information about nodes known to computing device 110. Alternatively, computing device 110 may provide this information along with its own request for information. It should, however, be noted that this is merely an illustrative example relating to establishing and/or joining a peer-to-peer network employing a self organizing network topology and that claimed subject matter is not limited in this regard.

In one particular embodiment, computing device 110 may attempt to assemble one or more files. In this embodiment, computing device 110 may, for example, already have one or more portions of a desired file. Based on the information gathered in the discussion above, computing device 110 may contact various computing devices on the network 100, such as computing devices 112, 114, 116, 118, 120, 122, 124, and/or 126 for one or more particular portions of the file. For example, while gathering information about the network, computing device 110 may have learned that a particular portion of a file is stored at computing device 124. Accordingly, while attempting to assemble the file, computing device 110 may request that computing device 124 provide that particular portion of the file. In this embodiment, computing device 110 may continue to contact other computing devices until it has assembled the desired file. Though, it should be noted that this is merely an illustrative example relating to assembling a file and that claimed subject matter is not limited in this regard.

In accordance with an embodiment, computing device 110 may intermittently contact one or more of the identified computing devices at least in part to evaluate network topology, such as by gathering information relating to peer nodes available for communication. For example, in some peer-to-peer networks peer nodes may become unavailable due to a variety of circumstances at one or more times. In addition, new computing devices may join the network from time to time and be available for communication as peer nodes. For example, users of the network may log on and/or log off the network from time to time. Furthermore, conditions associated with one or more peer nodes may change from time to time. For example, a communication latency associated with one of the nodes, such as computing device 126, may change over time, due to a variety of factors, including local conditions associated with computing device 126 and/or network conditions associated with computing device 126. Accordingly, it may be desirable for computing device 110 to intermittently determine information about computing devices available for communication, at least in part to determine updated characteristics of network 100.

In this particular embodiment, frequency of determining updated characteristics of the network may vary due to a number of factors. These factors may include the nature of the computing devices, the frequency with witch computing devices join and/or leave the network, the nature of the function provided by a particular program employing the peer-to-peer network, and/or the reliability of the computing devices that are part of the peer-to-peer network. For example, under some circumstances it may be desirable to update the list of computing devices identified for communication as frequently as every few seconds, such as every 10 seconds. In this embodiment, computing device 110 may randomly choose one of the identified computing devices every 10 seconds and request information about other computing devices from that randomly chosen computing device. In other embodiments it may be desirable to update the identified computing devices less frequently, such as every few minutes or so. It should, however, be noted that these are merely illustrative examples relating to updating a peer-to-peer network and that claimed subject matter is not limited in this regard.

Once the identified computing devices have been updated, computing device 110 may again attempt to assemble a desired file, such as by requesting one or more portions of the file from the second group of peer devices, for example. As the group of identified computing devices is updated, and as computing device 110 continues to request missing file portions, the desired file should eventually be assembled by computing device 110, assuming all portions are stored somewhere on the network. It should be noted, that although the above was described in terms of computing device 110, any computing device on the network may perform similar action, such as identifying groups of available peer devices, requesting file portions from one or more of the identified peer devices, updating the identified groups, etc. Accordingly, at any one time any node may be publishing a file portion or rendering a file portion. In addition, the role of a particular peer device will vary over time such that at one point a peer device may be publishing a file portion, while at another point that same peer device may be rendering a file portion. It should be noted that this is merely an illustrative example relating to a peer-to-peer network and that claimed subject matter is not limited in this regard.

Figure 2:
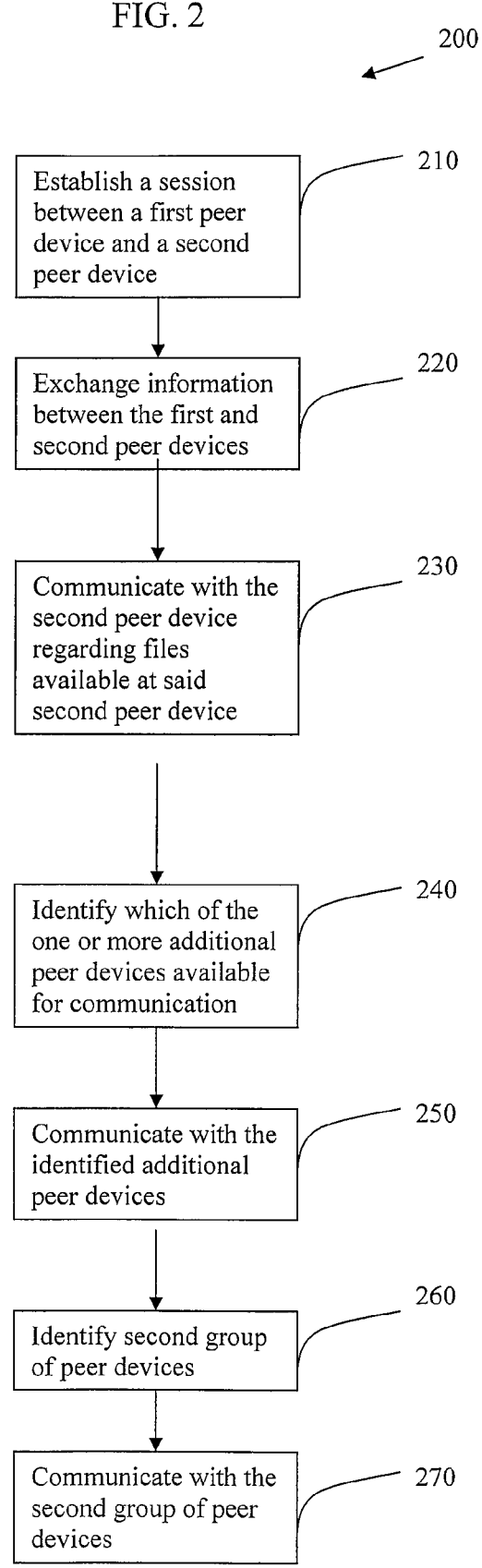
FIG. 2 is a flowchart of an embodiment, such as a method for organizing a network of computing platforms.

FIG. 2 is a flowchart of an embodiment, such as a method 200 for self organizing a network of peer devices, such as one or more computing devices. With regard to box 210, a first peer device, such as one of the computing devices described above with regard to FIG. 1, may establish a session with a second peer device. In this particular embodiment, a peer device may comprise a computing device and/or computing platform, such as computing platform operable to function as a node in a peer-to-peer network. For example, a peer device may be operable to publish and/or render various files, data, and/or file portions at different times and under different circumstances. In an embodiment, the first peer device may establish a session with the second computing device using one or more network communication protocols. Though, it should be noted that this is merely an illustrative example of establishing a session and that claimed subject matter is not limited in this regard. With regard to box 220, the first and second peer devices may exchange one or more pieces of information via the established session. In this particular embodiment, the first peer device may provide the second peer device with information relating to one or more additional peer devices available for communication. Likewise, the second peer device may provide the first peer device with information relating to one or more additional peer devices available for communication. In this embodiment, the first peer device may provide the second peer device with information sufficient to locate the additional peer devices. With regard to box 230, the first and second peer devices may also communicate via the established session regarding what file portions are available at the first and second peer devices, and/or file portions available at other peer devices, based at least in part on their respective prior communications with those devices.

With regard to box 240, the first and/or second peer devices may identify which of the additional peer devices are available and/or advantageous to communicate with. For example, first peer device may determine that a particular peer device is advantageous to communicate with because that device has low communication latency and one or more file portions desired by the first peer device. Accordingly, at box 250, the first peer device may communicate with the identified additional peer devices, at least in part to request and/or transfer one or more file portions. Under some circumstances it may also be advantageous to exchange information with the identified one or more peer devices as well, such as to identify more peer devices available for communication. Accordingly, with regard to box 260, the first peer device may communicate with the identified additional peer devices to gather information relating to any additional peer devices available for communication. Furthermore, the first peer device may identify a second group of peer devices available for communication. With regard to box 270, the first peer device may communicate with the second identified group to transfer one or more file portions and/or exchange one or more pieces of information. It should, however, be noted that these are merely illustrative examples relating to communication between peer devices and that claimed subject matter is not limited in this regard.

Figure 3:
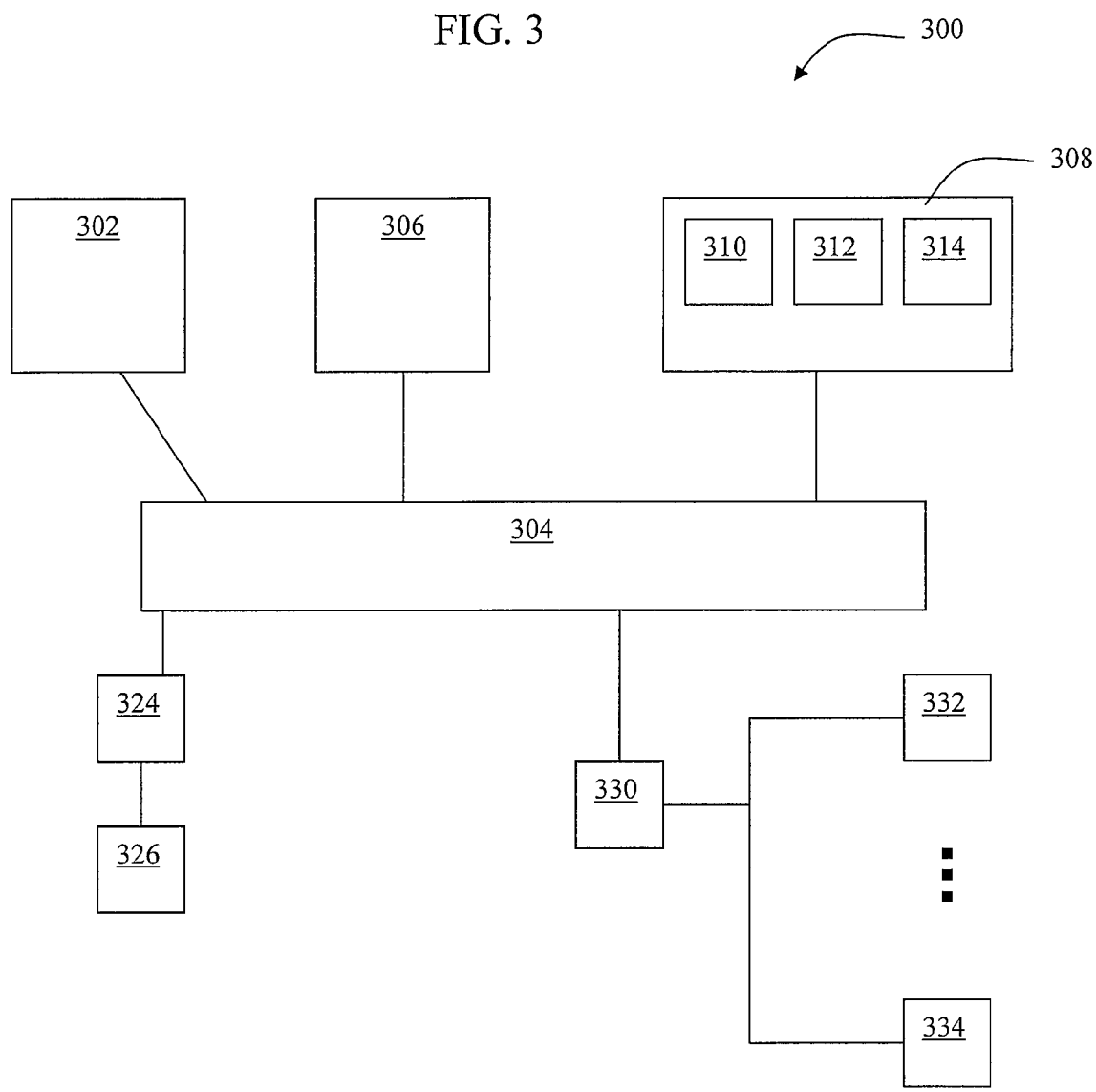
FIG. 3 is a schematic diagram of a computing platform.

FIG. 3, is a schematic diagram of a computing platform 300 that may host one or more of the peer devices as illustrated above according to a particular embodiment. Computing platform 300 includes a processing system 302, which may include a central processing unit such as a microprocessor or microcontroller for executing programs to control tasks in the computing platform 300, thereby enabling features and function described above. Moreover, the processing system 302 may include one or more additional processors, which may be discrete processors or may be built in to the central processing unit.

Processing system 302 is coupled with a bus 304, which is adapted to transmit signals between processing system 302 and other devices. Computing platform 300 may include embedded controllers, such as, for example, Generic or Programmable Logic Devices or Arrays (PLD, PLA, GAL, PAL), Field Programmable Gate Arrays (FPGA), Application Specific Integrated Circuits (ASIC), single-chip computers, smart cards, or the like.

Computing platform 300 may include a main memory 306 and one or more cache memories, and may also include a secondary memory 308. These memories provide storage of machine-readable instructions and data for computer programs to be execute by processing system 302. Here, main memory 306 and secondary memory 308 may comprise one or more of the above identified storage media. In the particular illustrated implementation, secondary memory 308 may include, for example, a hard disk drive 310, a removable storage drive 312, and/or a storage interface 314.

Computing platform 300 may also include a display system 324 for connecting to a display device 326 and an input/output (I/O) system 330 (e.g., one or more controllers or adapters for providing interface functions) for connecting to one or more I/O devices 332, 334. I/O system 330 may provide a communications interface, which allows information to be transmitted, in the form of signals, to computing platform 300 and external devices, networks or information sources. Signals may be transmitted in any type of transmission media (e.g., as electronic, electromagnetic or optical transmission media) to be received via a channel (e.g., wire, cable, optical fiber, phone line, infrared (IR) channel, radio frequency (RF) channel, etc.). A communications interface used to receive these signals may comprise a network interface controller designed for a particular type of network, protocol and/or transmission medium, and/or may be designed to serve multiple networks, protocols and/or channel media.

Machine-readable instructions may be stored in computing platform 300 and/or delivered to computing platform 300 over a communications interface. It should be understood that computing platform 300 is merely an example of a computing platform capable of hosting a peer device and that other systems, architectures, and modifications and/or reconfigurations may also be used without deviating from claimed subject matter.

In the preceding description, various aspects of claimed subject matter have been described. For purposes of explanation, specific numbers, systems and/or configurations were set forth to provide a thorough understanding of the claimed subject matter. However, it should be apparent to one skilled in the art having the benefit of this disclosure that claimed subject matter may be practiced without the specific details. In other instances, features that would be understood by one of ordinary skill were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all such modifications and/or changes as fall within the true spirit of claimed subject matter.

The invention claimed is:

1. A method comprising:
   at a first peer device, establishing a session with a second peer device;
   exchanging information with said second peer device via the established session regarding additional peer devices capable of providing one or more portions of one or more files, said exchanging the information with the second peer device including providing the second peer device information to locate one or more additional peer devices that are known to the first peer device but are not known to the second peer device and receiving from the second peer device information to locate one or more additional peer devices that are known to the second peer device but are not known to the first peer device;
   communicating with said second peer device via the established session regarding specific portions of files available from said second peer device;
   identifying a group of one or more additional peer devices available for communication based at least in part on the exchanged information;
   communicating with one or more of the identified group of one or more additional peer devices, at least in part, to transmit one or more portions of one or more files;
   intermittently communicating with at least one of the identified group of one or more additional peer devices;
   exchanging information with the at least one of the identified group of one or more additional peer devices via the intermittent communications regarding other additional peer devices that are capable of providing one or more portions of one or more files, said intermittently exchanging the information with the at least one of the identified group of one or more additional peer devices including providing the at least one of the identified group of one or more additional peer devices information to locate one or more additional peer devices that are currently known to the first peer device but are not currently known to the at least one of the identified group of one or more additional peer devices and receiving from the at least one of the identified group of one or more additional peer devices information to locate one or more additional peer devices that are currently known to the at least one of the identified group of one or more additional peer devices but are not currently known to the first peer device; and
   communicating with at least one of said other additional peer devices at least in part to gather information relating to portions of files available at one or more of the other additional peer devices.

2. The method of claim 1, and further comprising:
   updating the group of one or more additional peer devices to communicate with based at least in part of the gathered information.

3. The method of claim 2, and further comprising:
   communicating with the updated group of one or more peer devices, at least in part, to transmit one or more portions of one or more files.

4. The method of claim 2, wherein said exchanging information with said second peer device and said exchanging information with the at least one of the identified group of one or more additional peer devices comprises employing a self organizing network topology.

5. The method of claim 4, wherein said identifying and said updating the group of one or more additional peer devices comprises establishing a peer-to-peer file sharing network based, at least in part, on said self organizing network topology.

6. The method of claim 2 wherein said identifying and said updating the group of one or more additional peer devices available for communication are further based on determining, by the first peer device, devices from among the additional peer devices and from among the other additional peer devices that have low communication latency.

7. A non-transitory computer readable storage medium having instructions stored thereon that are executable by a computing platform at a first device to perform operations comprising:
   establishing a session with a second peer device;
   exchanging information with said second peer device via the established session regarding additional peer devices capable of providing one or more portions of one or more files, said exchanging the information with the second peer device including providing the second peer device information to locate one or more additional peer devices that are known to the first peer device but are not known to the second peer device and receiving from the second peer device information to locate one or more additional peer devices that are known to the second peer device but are not known to the first peer device;
   communicating with said second peer device via the established session regarding specific portions of files available at said second peer device;
   identifying a group of one or more additional peer devices available for communication based at least in part on the exchanged information;

communicating with one or more of the identified group of one or more additional peer devices, at least in part, to transmit one or more portions of one or more files;

intermittently communicating with at least one of the identified group of one or more additional peer devices;

exchanging information with the at least one of the identified group of one or more additional peer devices via the intermittently established sessions regarding other additional peer devices that are capable of providing one or more portions of one or more files, said intermittently exchanging the information with the at least one of the identified group of one or more additional peer devices including providing the at least one of the identified group of one or more additional peer devices information to locate one or more additional peer devices that are currently known to the first peer device but are not currently known to the at least one of the identified group of one or more additional peer devices and receiving from the at least one of the identified group of one or more additional peer devices information to locate one or more additional peer devices that are currently known to the at least one of the identified group of one or more additional peer devices but are not currently known to the first peer device; and communicating with at least one of said other additional peer devices at least in part to gather information relating to portions of files available at one or more of the other additional peer devices.

8. The medium of claim 7, wherein said instructions are further executable by said computing platform to perform operations comprising:

updating the group of one or more additional peer devices to communicate with based at least in part of the gathered information.

9. The medium of claim 8, wherein said instructions are further executable by said computing platform to perform operations comprising:

communicating with the updated group of one or more peer devices, at least in part, to transmit one or more portions of one or more files.

10. The medium of claim 8, wherein said instructions are further executable by said computing platform to perform operations comprising exchanging information with said second peer device and with the at least one of the identified group of one or more additional peer devices by employing a self organizing network topology.

11. The medium of claim 10, wherein said instructions are further executable by said computing platform to perform operations comprising identifying and updating said group of one or more additional peer devices by establishing a peer-to-peer file sharing network based, at least in part, on said self organizing network topology.

12. The medium of claim 8 wherein said instructions are further executable by said computing platform to perform said identifying and said updating the group of one or more additional peer devices available for communication by performing operations comprising updating the group of one or more additional peer devices available for communication based on determining devices from among the additional peer devices and from among the other additional peer devices that have low communication latency.

* * * * *